United States Patent
Barfield, Jr. et al.

(10) Patent No.: US 9,390,612 B2
(45) Date of Patent: Jul. 12, 2016

(54) USING AUDIO SIGNALS IN PERSONAL EMERGENCY RESPONSE SYSTEMS

(71) Applicant: HTI IP, L.L.C., Arlington, VA (US)

(72) Inventors: James Ronald Barfield, Jr., Atlanta, GA (US); Stephen Christopher Welch, Atlanta, GA (US)

(73) Assignee: Verizon Telematics, Inc., Atlanta, GA (US)

( * ) Notice: Subject to any disclaimer, the term of this patent is extended or adjusted under 35 U.S.C. 154(b) by 237 days.

(21) Appl. No.: 14/090,936

(22) Filed: Nov. 26, 2013

(65) Prior Publication Data
US 2015/0145662 A1    May 28, 2015

(51) Int. Cl.
| | |
|---|---|
| B60Q 1/00 | (2006.01) |
| G08B 25/01 | (2006.01) |
| B60Q 5/00 | (2006.01) |
| G08B 21/04 | (2006.01) |
| G08B 25/00 | (2006.01) |

(52) U.S. Cl.
CPC ................ *G08B 25/016* (2013.01); *B60Q 5/00* (2013.01); *G08B 21/043* (2013.01); *G08B 21/0446* (2013.01); *G08B 21/0492* (2013.01); *G08B 25/001* (2013.01)

(58) Field of Classification Search
CPC ................................... G08B 1/00; G06F 1/00
See application file for complete search history.

(56) References Cited

U.S. PATENT DOCUMENTS

| | | | |
|---|---|---|---|
| 2013/0197856 A1* | 8/2013 | Barfield | G01P 15/00 702/141 |
| 2014/0266690 A1* | 9/2014 | McKinley | G08B 25/006 340/539.11 |

OTHER PUBLICATIONS

Author unknown; Lifecomm Brochure: "Lifecomm Expanding Your World: Next Generation Mobile Personal Emergency Response System," Printed Aug. 30, 2013.

* cited by examiner

*Primary Examiner* — Shirley Lu (57) ABSTRACT

A personal emergency response (PER) device may include an audio sensor that is used to enhance the operation of the PER device. The audio sensor may obtain audio data that can be used to verify whether a fall event that is detected by the PER device is a false positive signal and/or enhance the reliability of a detected fall event. In some implementations, the audio data may be used in the detection of vehicle crashes in which a user of the PER device is involved.

14 Claims, 7 Drawing Sheets

USING AUDIO SIGNALS IN PERSONAL EMERGENCY RESPONSE SYSTEMS

BACKGROUND

Mobile personal emergency response systems (PERs) include devices designed to be worn by individuals, such as a device implemented in a bracelet or watch form factor, that provides services, such as automatic fall detection, to the user. PER devices may be particularly useful to the elderly or to other individuals who have a higher than normal chance of becoming incapacitated due to a fall or other accident. A PER device may include a wireless communication link and logic, such as an accelerometer and an associated control circuit, to automatically detect falls.

In the event of an emergency, such as an automatically detected fall or a user-triggered emergency (e.g., a user pressing a "talk" or "communicate" button), the PER device may place a call to an emergency operator, who may evaluate the situation and determine an appropriate response, such as requesting an ambulance for the user. For example, in response to the automatic detection of a potential fall by the user (e.g., the wearer of the PER device), the PER device may place a call to an emergency operator. If the emergency operator is unable to communicate with the user, or the user indicates that there is a problem (e.g., the user has fallen and can't get up), the emergency operator may call for an ambulance or take other emergency action (e.g., call a neighbor or another designated emergency contact).

With a PER device, it can be important to be able to accurately detect events. Fall events that are not detected by the PER device may result in a failure to obtain emergency help for an injured user. Additionally, false positive fall events (i.e., events signaled by the PER device as a fall event but which are not fall events) can annoy the user and cause undue expense/strain on the communication infrastructure and/or the emergency response system.

DETAILED DESCRIPTION OF PREFERRED EMBODIMENTS

The following detailed description refers to the accompanying drawings. The same reference numbers in different drawings may identify the same or similar elements.

Techniques described herein may relate to the use of an audio sensor (e.g., a microphone) in a PER device to enhance the operation of the PER device. In one implementation, audio may be recorded by the PER device in response to the detection of a potential fall event, such as a potential fall event detected based on information from pressure or acceleration sensors of the PER device. The audio may be automatically transmitted to an emergency response center, to allow the emergency response center to better dispatch appropriate emergency personnel. Alternatively or additionally, in response to the detection of a potential fall event, audio may be recorded by the PER device and used to enhance the reliability of the detection of the fall event. For example, a "hard sit" or abrupt movement by a wearer of the PER device may cause the PER device to initially incorrectly classify output information from a pressure and/or acceleration sensor as a fall event. Analysis of subsequent audio information, however, may indicate that the wearer of the PER device is not in distress, and may therefore cancel the indication of the fall event.

In some implementations described herein, the audio sensor of the PER device may continually record and analyze audio (e.g., regardless of the detection of a potential fall event). In this situation, the PER device may perform pattern recognition on the audio data to determine, based on the audio data, whether the wearer of the PER device has been involved in a vehicle accident or other traumatic event. For example, detection of sounds commonly associated with a vehicle accident (e.g., screeching tires, crash sounds, etc.) may be used to determine whether the wearer of the PER device is involved in a car accident. Alternatively or additionally, the audio sensor of the PER device may continually record and analyze audio to determine whether the wearer is actively calling for help, such as by detecting predetermined keywords or phrases such as "help," "help me," "help PER device," etc.

Figure 1:
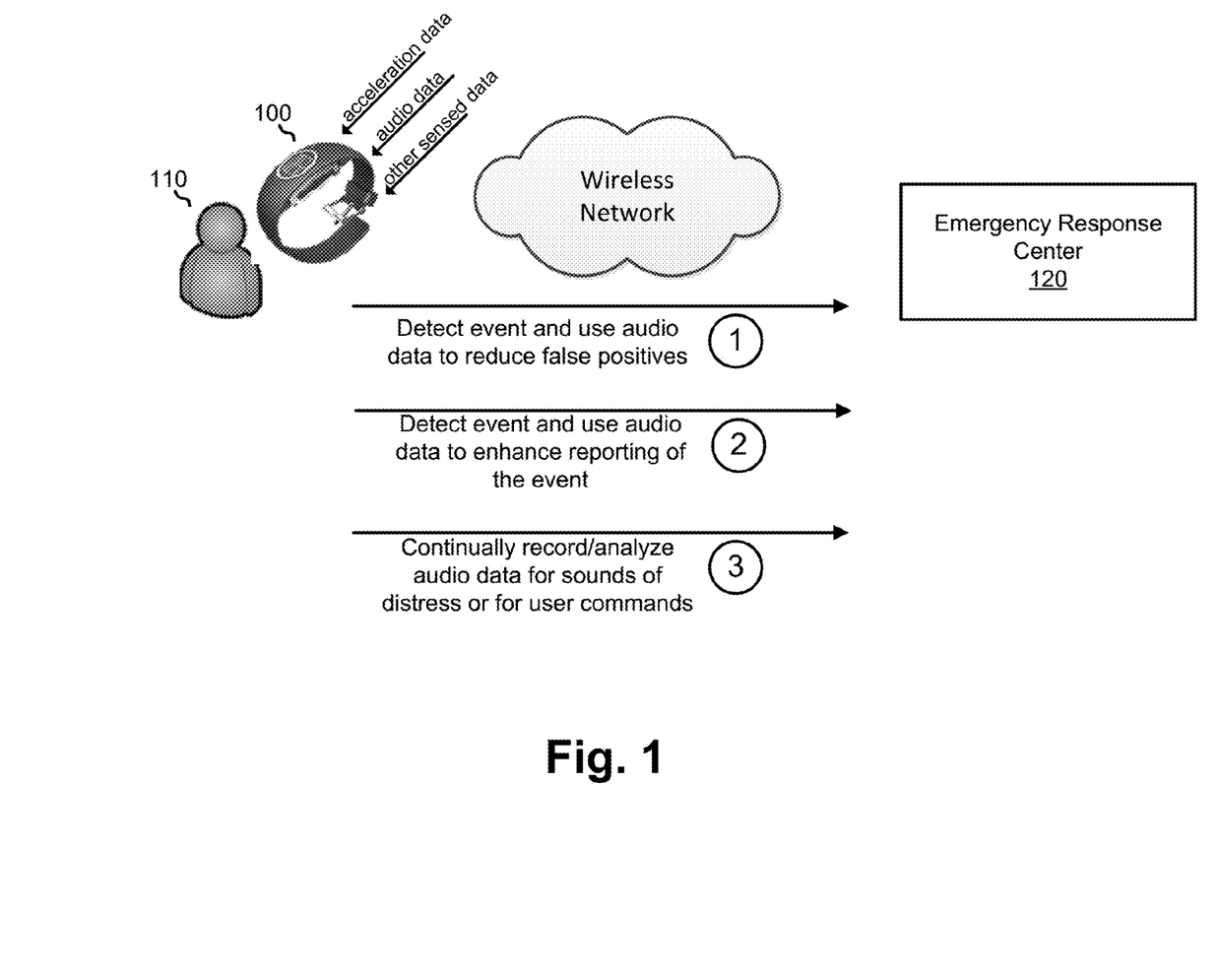
FIG. 1 is a diagram conceptually illustrating an example of an overview of concepts described herein.

FIG. 1 is a diagram conceptually illustrating an example of an overview of concepts described herein. A PER device 100, associated with a user 110 (e.g., worn on a wrist of user 110 or otherwise carried or attached by user 110) may be operatively coupled (e.g., via a wireless network) to an emergency response center 120. PER device 100 may include an accelerometer, a microphone, and/or other sensors. Emergency response center 120 may include a call center that includes operators trained to respond to emergency calls initiated by PER device 100. PER device 100 may initiate emergency calls in response to, for example, automatic detection of a fall event or other emergency event by user 100 or in response to the user explicitly requesting help (e.g., by pressing a "help" button on PER device 100).

As illustrated in FIG. 1, PER device 100 may operate based on data from a number of sensors, such as an accelerometer ("acceleration data"), a microphone ("audio data"), and/or other sensors ("other sensed data," such as a pressure sensor). Based on the sensed data, PER device 100 may automatically detect and report events to emergency response center 120. Consistent with aspects described herein, PER device 100 may use the audio data to enhance the automatic classification of events (e.g., fall events) and/or event reporting. For example, in one implementation, the audio data may be used to reduce false positives associated with acceleration events that are initially classified as fall events (communication indicated by the arrow labeled (1)). As an example of this, PER device 100 may determine, based on an analysis of four seconds audio data beginning from the detection of a fall event, that user 100 is engaged in a normal conversation after the potential fall event. Accordingly, PER device 100 may determine that the fall event was likely a false positive and PER device 100 may refrain from signaling emergency response center 120.

In another possible implementation, PER device 100 may use the audio data to enhance the reporting of an event (communication indicated by the arrow labeled (2)). For instance, if PER device 100 determines that the four seconds of audio data either confirms a potential fall or does not negate the fall event classification, PER device 100 may automatically call emergency response center 120 and provide the audio data to an operator, who may use the audio data to enhance their ability to respond to the situation (e.g., if the operator hears sounds of distress, the operator may immediately request an ambulance be dispatched to the location of user 100).

In some implementations, instead of recording and analyzing audio data in response to a triggering condition (e.g., fall event), PER device 100 may continuously record and analyze audio data. The audio data may be analyzed for particular sounds or commands indicating user 100 needs or is requesting help (communication indicated by the arrow labeled (3)). As mentioned, the audio data may be analyzed to determine whether user 100 actively calls for help or whether certain sounds indicate the occurrence of an emergency event such as a vehicle crash. With respect to the determination of whether certain sounds indicate the occurrence of an emergency event, other sensor data, such as accelerometer data may also be used to enhance the determination of whether the certain sounds indicate the occurrence of the emergency event.

Figure 2:
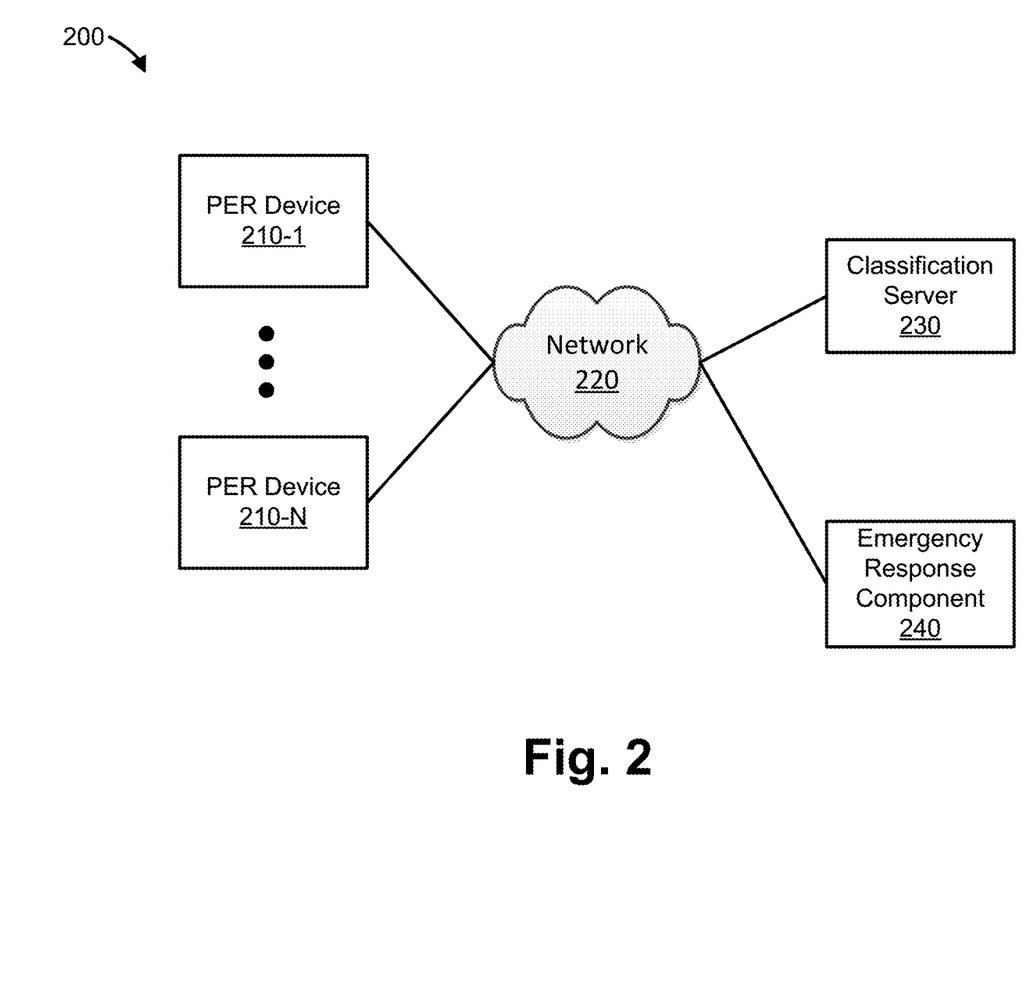
FIG. 2 is a diagram of an example environment in which systems and/or methods described herein may be implemented.

FIG. 2 is a diagram of an example environment 200, in which systems and/or methods described herein may be implemented. Environment 200 may correspond to an environment in which one or more PER devices are deployed.

As illustrated, environment 200 may include a number of PER devices 210-1 through 210-N (referred to herein collectively as "PER devices 210" and/or individually as "PER device 210"), network 220, classification server 230, and emergency response component 240. Each PER device 210 may correspond to a wearable computing device designed to provide assistance and monitoring for users (such as user 100, not illustrated in FIG. 2). As mentioned previously, a PER device 210 may include the ability to detect when a user falls and may automatically report the fall to an emergency response operator. Detection of a fall or non-fall event may be based, at least in part, on acceleration or pressure measurements provided by an accelerometer. An example of a PER device 210 is described in more detail with reference to FIG. 3.

Network 220 may include one or more networks that act to operatively couple PER devices 210 to classification server 230 and/or emergency response component 240. Network 220 may include, for example, a local area network (LAN), a wide area network (WAN), a metropolitan area network (MAN), and/or another type of network. In some implementations, network 220 may include packet-based Internet Protocol (IP) networks, and connectivity to network 220 may be achieved through wireless connections (e.g., a cellular wireless network). For instance, network 220 may provide wireless connectivity for voice and data communications with PER devices 210.

Classification server 230 may include one or more computing devices, which may be centrally located or geographically distributed. Although referred to as a "server," classification server 230 may correspond to a traditional server, a cluster of server devices, a cloud-based service, an application server, or another implementation that provides services and/or data storage relating to PER devices 210. Classification server 230 may control the classification (including pattern matching) techniques performed by PER device 210. Classification server 230 transmit the classification models to PER devices 210, which may then use the classification models to detect and report events (e.g., fall events) by the corresponding users of the PER devices.

Emergency response component 240 may include one or more devices or systems designed to provide emergency response services. Emergency response component 240 may generally correspond to emergency response center 120 of FIG. 1. As an example, emergency response component 240 represent a call center that employs operators trained to handle telephone calls from users that may require assistance. The operators may speak to the user that potentially requires assistance and/or may view device-specific or user-specific data that is reported by the corresponding PER device 210 of the user. Depending on the situation, the operator may take actions to assist the user, such as by calling for an ambulance, contacting a designated emergency contact for the user, or assisting the user in some other way. Furthermore, emergency response component 240 could interface with current 911 and emergency personal dispatch systems, such as those provided by governments.

Figure 3:
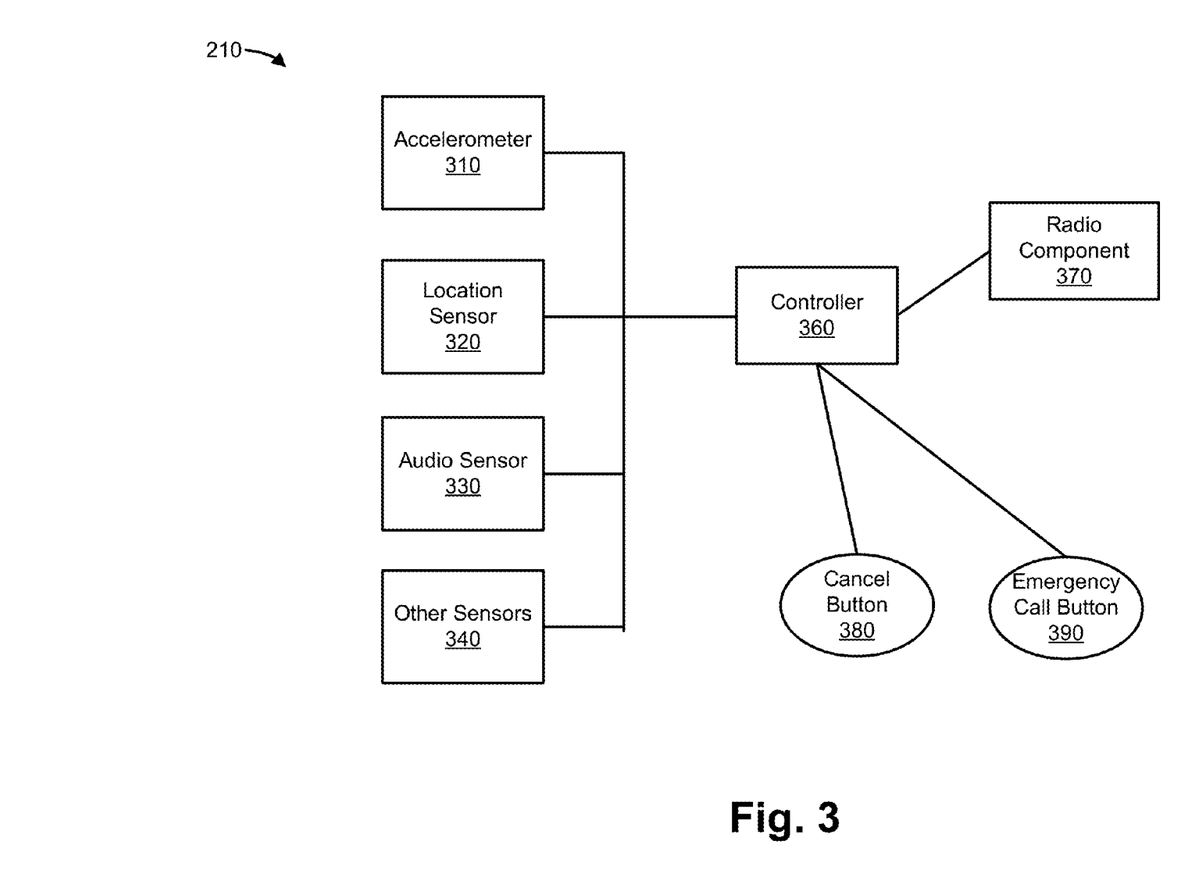
FIG. 3 is a diagram illustrating functional components corresponding to an example implementation of a PER device.

FIG. 3 is a diagram illustrating functional components corresponding to an example implementation of PER device 210. As mentioned, in some implementations, PER device 210 may be designed as a wearable device (e.g., a bracelet, a band, a watch or smart watch). In other possible implementations, PER device 210 may be implemented as software on another computing device, such as a smart phone that includes an accelerometer and a microphone. As illustrated in FIG. 3, PER device 210 may include accelerometer 310, location sensor 320, audio sensor 330, other sensors 340, controller 360, radio component 370, cancel button 380, and emergency call button 390.

Accelerometer 310 may be an accelerometer that measures proper acceleration (e.g., measurable physical acceleration with respect to an at-rest reference point). The acceleration, measured by accelerometer 310, may be output as three acceleration values corresponding to acceleration measured along three orthogonal axes (e.g., X, Y, and Z axes). Acceleration values may be received and acted upon by controller 360.

Location sensor 320 may include a sensor designed to determine the geographic location (e.g., latitude and longitude) of PER device 210. Location server 320 may include, for example, a global positioning system (GPS) sensor, a GLONASS-based sensor (a global navigation based satellite system that is an alternative to GPS), and/or other sensors for determining position. A location (e.g., the present geographical location of PER device 210) may be transmitted to classification server 230 and/or emergency response component 240, such as to assist in calling for emergency response personnel for a user that is in distress (e.g., has fallen). In some implementations, alternative or additional techniques may be used to determine the geographic location of PER device 210 (e.g., triangulation using cellular towers).

Audio sensor 330 may include a microphone or other sensor to measure audio. The audio data, measured by audio sensor 330, may be output as an analog or digital stream. In some implementations, audio sensor 330 may include or be associated with a buffer, such as a circular buffer in which, when audio sensor 330 is active, audio data may be continuously stored (e.g., the last X seconds of audio data, where X is a real positive value) and may be available for processing by controller 360. The audio data may be received and acted upon by controller 360.

Other sensors 340 may represent any additional sensors (e.g., environmental sensors) that may be implemented by PER device 210. In general, the additional sensors may include any sensors that may measure information that may be useful in the detection of falls. For example, the additional sensors may include barometric pressure sensors, gyroscopes, magnetometers, proximity sensors, temperature sensors, light sensors (e.g., photo diode sensors), altimeter sensors, infrared sensor, sensors designed to detect a physical condition of a user (e.g., blood pressure, heart rate, glucose, variable heart rate, blood oxygen, etc.), and/or other types of sensors.

Controller 360 may include a microcontroller, processor, or another processing device or circuit used to control the operation of PER device 210. Controller 360 may additionally include or be communicatively coupled to computer-readable media (e.g., a computer memory and/or another type of non-transitory computer-readable medium) that may store instructions for execution by controller 360. Controller 360 may additionally evaluate one or more classification models and/or pattern recognition techniques used to detect whether a user of PER device 210 has experienced an event (e.g., a fall event). The classification models may be received, via network 220, from classification server 230 and/or may be generated locally by PER device 210. In operation, controller 360 may generally receive acceleration data from accelerometer 310, and potentially other data from audio sensor 330 and/or other sensors 330. Controller 360 may use the received data as inputs to the classification models.

Radio component 370 may include logic to manage a radio interface, such as a radio interface used to wirelessly connect to network 220. In one implementation, radio component 370 may provide an interface to a wireless cellular network. Radio component 370 may include one or more antennas and corresponding transceiver circuitry.

PER device 210 may additionally include one or more buttons through which a user may interact with PER device 210, such as cancel button 340. A user of PER device 210 may be instructed to press cancel button 340 when PER device 210 falsely detects an event such as a fall event. PER device 210 may indicate, to the user, the detection of the event, such as by playing a sound or providing a visual indication. When the user notices the indication of the event and the user does not need emergency assistance, the user may activate cancel button 340 to indicate that no emergency assistance is required. Emergency call button 390 may be used by the user, of PER device 210, to explicitly call for emergency assistance. Activating emergency call button 390 may, for example, initiate a telephone call with an emergency response operator (e.g., an operator associated with emergency response component 240).

Although FIGS. 2 and 3 illustrate example components of an environment 200 and/or a PER device 210, respectively, in other implementations, environment 200 and/or PER device 210 may contain fewer components, different components, differently arranged components, or additional components than those depicted. Alternatively, or additionally, one or more of the depicted components may perform one or more other tasks described as being performed by one or more other ones of the depicted components.

In the operation of PER device 210, it may be important to be able to detect fall events and minimize false positives (i.e., non-fall events that are detected as fall events). Consistent with aspects described herein, a classification model may be used to classify acceleration events as either fall events or non-fall events. Audio data, from audio sensor 330, may be additionally used as either an input to the classification model or as a post-classification operation designed to eliminate false positive classifications.

Figure 4:
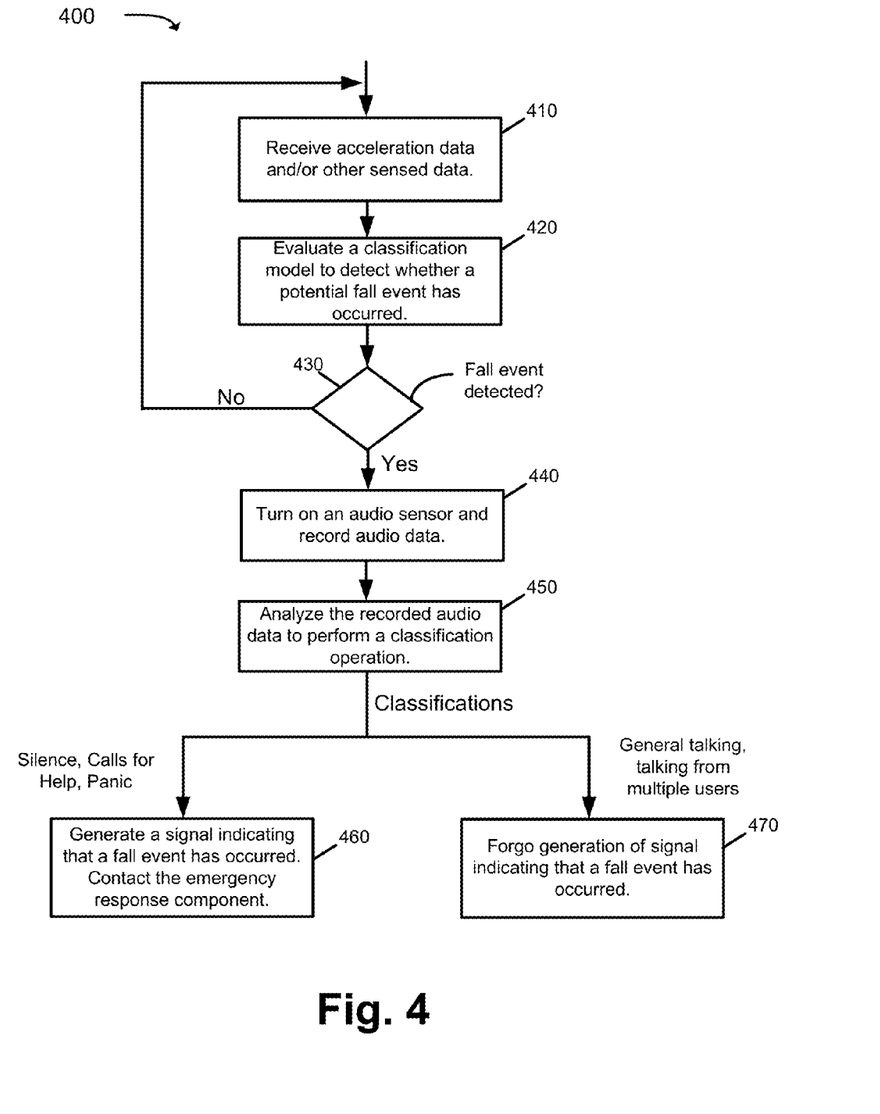
FIG. 4 is a flow chart illustrating an example process relating to the detection of fall events based on the recording of audio in response to a trigger event.

FIG. 4 is a flow chart illustrating an example process 400 relating to the detection of fall events based on the recording of audio in response to a trigger event. Process 400 may be performed, for example, by PER device 210.

Process 400 may include receiving acceleration data and/or other sensed data (block 410). As mentioned, sensors associated with PER device 210, such as accelerometer 310 and other sensors 340 (e.g., a pressure sensor) may generate data measuring the physical quantity that is associated with the sensor. For example, accelerometer 310 may generate a time series of three orthogonal acceleration values (e.g., along the X, Y, and Z axes), which may be converted into a time series of acceleration magnitude values (e.g., by summing the squares of each of the three-axis acceleration values and taking the square root of the sum).

Process 400 may further include evaluating a classification model to detect whether a potential fall event has occurred (block 420). In one implementation, the classification model may include a classification model that was previously trained and/or generated by PER device 210 and/or by classification server 230 (and provided to PER device 210). The classification model may be implemented using a number of different types of classification techniques, such as binary classification trees (BCTs), neural networks, pattern matching techniques, etc.

The classification model may be trained based on training data that is known to correspond to a fall or non-fall event. In one implementation, training data for the classification model may include, for each training record, a number of acceleration magnitude values (e.g., a number of acceleration values of a predetermined length) and a corresponding known indication of whether the acceleration magnitude values corresponded to a fall or non-fall event. Alternatively or additionally, additional sensor data and/or information relating to the particular user of PER device 210 may also be used as inputs for the classification model.

When a fall event is not detected (block 430—NO), process 400 may return to block 410, where sensor data may continue to be received (block 410) and classified (block 420). In this manner, PER device 210 may continually monitor sensor data to determine whether user 100, of PER device 210, experiences a fall event.

When a fall event is detected (block 430—YES), process 400 may include turning on an audio sensor to record audio data (block 440). For example, audio sensor 330 may be powered on or activated to begin recording audio data. In one implementation, audio data may be recorded for a predetermined period (e.g., 5 seconds). In this manner, audio sensor 330 may be used to capture the audio, associated with the user of PER device 210, in the time period immediately following a potential fall event.

Process 400 may further include analyzing the recorded audio to perform a classification operation on the recorded audio (block 450). For example, in one implementation, controller 360 may use a classification model to apply classification techniques to determine a classification category that applies to the recorded audio. The potential classification categories may be determined during initial training of the classification model, such as by training at PER device 210 and/or at classification server 230. In general, the classification techniques may be used to determine whether the recorded audio is consistent with sounds that are likely to occur after a fall event or whether the recorded audio is consistent with sounds that indicate that the user has not fallen. The classification model, to classify the recorded audio, may be implemented using a number of different types of classification techniques, such as BCTs, neural networks, pattern recognition techniques, etc.

Two possible classification categories are illustrated in FIG. 4: the classifications labeled "silence, calls for help, panic" and "general talking, talking from multiple users." In other implementations, additional possible classification categories may be used. The classification category "silence, calls for help, panic" may be associated with audio that indicate that the user has fallen. In general, these sounds may indicate sounds of distress (e.g., crying, moaning, shouts of pain), explicit calls for help, or silence (which may indicate that the user is incapacitated). The classification category "general talking, talking from multiple users" may be associated with sounds that indicate that the user has not fallen, is not in distress, or is in the company of other people that can assist the user. For example, speaking by multiple users or general talking or conversation may indicate that the user does not require additional assistance.

When the classification category is determined as "silence, calls for help, panic," process 400 may include generating a signal that a fall event has occurred (block 460). For example, PER device 210 may output an audio, visual, or other indication to a user of PER device 210 indicating that PER device 210 has detected a fall event. The user may thus be given the opportunity to press cancel button 380 if the user does not need assistance. If the user does not press cancel button 380 within a certain time period (e.g., 10 seconds), PER device 210 may contact, such as via a wireless cellular connection through network 220, emergency response component 240 to report a potential fall event (block 460).

Alternatively, in some implementations, PER device 210 may immediately contact emergency response component 240 without necessarily waiting for the user to press cancel button 380. As one example, if the classification of the recorded audio detects a predetermined keyword such as "help" or "help me," PER device 210 may immediately contact emergency response component 240. However, if PER device 210 detects silence or the classification of the recorded audio is ambiguous as to the status of the user, PER device 210 may wait, for a predetermined period, for the user to press cancel button 380. If the user does not press cancel button 380 at the end of the predetermined period, PER device 210 may contact emergency response component 240. In this manner, whether to immediately contact emergency response component 240 or to wait (for a certain period) before contacting emergency response component 240, may be based on the result of the classification of the recorded audio.

In some implementations, when contacting emergency response component 240, PER device 210 may provide information relating to the recorded audio, such as the determined classification category, to an operator associated with emergency response component 240. Alternatively or additionally, the recorded audio may be provided to the operator associated with emergency response component 240. The operator may thus to be able to make an informed decision relating to an appropriate response for the user.

When the classification category is determined as "general talking, talking from multiple users," process 400 may include forgoing the generation of the signal indicating that a fall event has occurred (block 470). In this situation, the fall event determined based on the acceleration data (and potentially other sensed data) may be a false positive determination and may be ignored (e.g., a "hard sit" or other movement that was classified by the acceleration data as a fall event but which the user is not in need of assistance). Although not explicitly shown, in this situation, process 400 may return to block 410.

Figure 5:
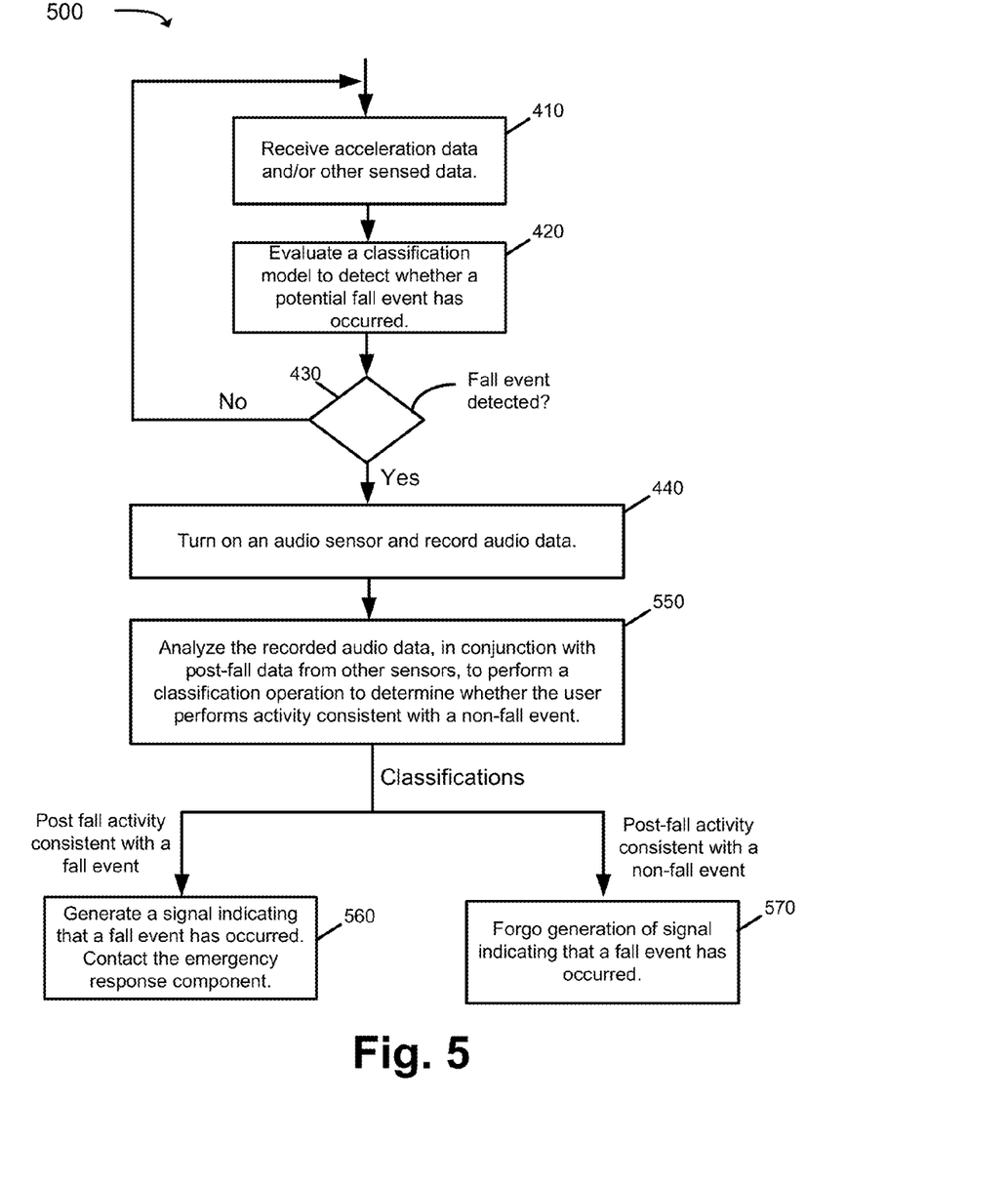
FIG. 5 is a flow chart illustrating another example process relating to the detection of fall events based on the recording of audio in response to a trigger event.

FIG. 5 is a flow chart illustrating another example process 500 relating to the detection of fall events based on the recording of audio in response to a trigger event. Process 500 may be performed, for example, by PER device 210. For brevity, the description of operations in process 500 that are similar or identical to process 500 (blocks 410-440) will not be repeated in detail.

As illustrated, process 500 may include receiving acceleration data and/or other sensed data (block 410), evaluating a classification model to detect whether a fall event has occurred (blocks 420 and 430), and turning on an audio sensor to record audio data when a fall event occurs (block 440).

Process 500 may further include analyzing the recorded audio, in conjunction with post-fall data from other sensors, to perform a classification operation to determine whether the user performs activity consistent with a non-fall event (block 550). For example, a user walking at a normal pace, a user that got up off the ground, a user conversing normally with other people, or other activity after the initially detected fall event (e.g., as detected in blocks 420 and 430), may indicate that the user is not in distress and that the services of an emergency response operator are not needed. In one implementation, a variety of types of sensor data, corresponding to data measured after the initially detected fall event, may be used to perform the classification performed in block 550. For example, data from accelerometer 310, location sensor 320, and/or audio sensor 330 may be used. Alternatively or additionally, data from other sensors, such as a barometer, a gyroscope, and/or a magnetometer may be used.

In one implementation, the classification operation of block 550 may be performed using one or more classification models, such as classification models trained at PER device 210 and/or at classification server 230. In general, the classification models may be implemented using classification techniques such as BCTs, neural networks, pattern recognition techniques, etc., in which training data is labeled with correct classification results (e.g., such as by manual analysis of the sensor data).

Two possible classification categories are illustrated in FIG. 5: the classifications labeled "post-fall activity consistent with a fall event" and "post-fall activity consistent with a non-fall event." In other implementations, additional possible classification categories may be used. The classification category "post-fall activity consistent with a fall event" may be associated with sensor data that confirms that a user has fallen (or does not negate the initial determination that the user has fallen). For example, sensor data consistent with a fall event may include: acceleration and/or location data that indicates that a user is not moving, acceleration data that indicates that a user is flailing or moving in a way that indicates physical stress, data measuring the physical condition of the user (e.g., heart rate, blood pressure, etc.), and/or audio data indicating sounds of distress (e.g., crying, moaning, shouts of pain). The classification category "post-fall activity consistent with a non-fall event" may be associated with sensor data that indicates that the user has not fallen, is not in distress, or is in the company of other people that can assist the user. For example, sensor data consistent with a non-fall event may include: acceleration and/or location data that indicates that the user has stood up, acceleration data that indicates that a user is walking normally, and/or audio data indicating that the user is speaking normally and/or conversing with a number of other people.

When the classification category is determined as "post-fall activity consistent with a fall event," process 500 may include generating a signal that a fall event has occurred (block 560). For example, PER device 210 may output an audio, visual, or other indication to a user of PER device 210 indicating that PER device 210 has detected a fall event. The user may be given the opportunity to press cancel button 380 if the user does not need assistance. If user does not press cancel button 380 within a certain time period (e.g., 10 seconds), PER device 210 may contact, such as via a wireless cellular connection through network 220, emergency response component 240 to report a potential fall event (block 560).

As discussed with respect to process 400, alternatively, in some implementations, PER device 210 may immediately contact emergency response component 240, without waiting for the user to press cancel button 380. In some such implementations, when cancel button 380 is pressed subsequent to emergency response component 240 being contacted, PER device 210 may notify emergency response component 240 that cancel button 380 has been pressed.

In one possible implementation, the single illustrated category "post-fall activity consistent with a fall event" may include a number of sub-categories that may be associated with varying levels of certainty that the user is in distress. A classification corresponding to a subcategory in which there is a relatively high certainty that the user is distress may result in PER device 210 immediately contacting emergency response component 240 without waiting for the user to press cancel button 380. On the other hand, classifications corresponding to a subcategory in which there is a lower certainty that the user is in distress may result in PER device 210 waiting for a period (e.g., 10 seconds), for the user to press cancel button 380, before contacting emergency response component 240.

When the classification category is determined as "post-fall activity consistent with a non-fall event," process 500 may include forgoing the generation of the signal indicating that a fall event has occurred (block 570). In this situation, the initial fall event determined based on the acceleration data (and potentially other sensed data) may be a false positive classification. In this case, process 500 may return to block 410 (not explicitly shown in FIG. 5).

Figure 6:
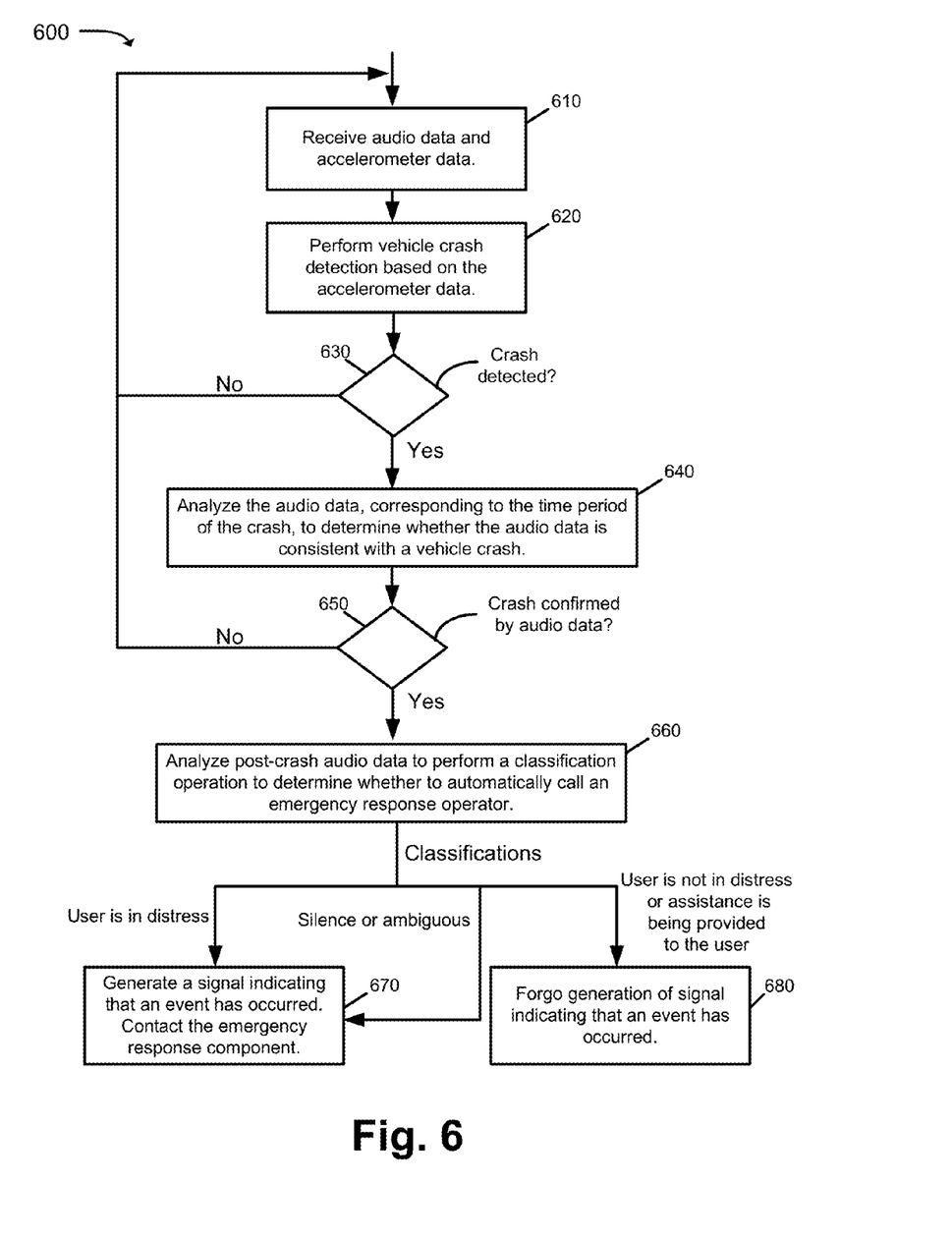
FIG. 6 is a flow chart illustrating an example process relating to the detection of vehicle accidents.

In the above discussion, audio sensor 330 was used to enhance the operation of PER device 210 in detecting user fall events. In other implementations, PER device 210 may be used to detect other types of events, such as vehicle accidents, that relate to user 100 of PER device 210. For example, FIG. 6 is a flow chart illustrating an example process 600 relating to the detection of vehicle accidents. Process 600 may be performed, for example, by PER device 210 when user 100 is in a vehicle (e.g., a car). In some implementations, PER device 210 may automatically detect when a user is riding in a vehicle and may perform process 600 in response thereto. Automatic detection of when PER device 100 is in a vehicle may be based on, for example, a pairing, such as via a short range wireless interface, of PER device 210 with sensors or other devices in the vehicle. As another example, automatic detection of when PER device 210 is in a vehicle may include determining, based on data from location sensor 320, that PER device 210 is moving at speeds consistent with riding in a vehicle. As yet another example, PER device 210 may be included within or as a part of the vehicle.

Process 600 may include receiving audio data and accelerometer data (block 610). For example, audio sensor 330 may include or be associated with a buffer, such as a circular buffer, in which audio data may be continuously stored and may be available for processing by controller 360. Similarly, accelerometer 310 may include or be associated with a buffer, such as a circular buffer, in which acceleration measurements may be continuously stored and may be available for processing by controller 360. In some implementations, data associated with other sensors 340 (e.g., pressure data, GPS-based location data) may also be received and used in process 600. In one implementation, some of the other sensors 340 may include sensors installed within the vehicle itself (e.g., impact detectors), where the data of the sensors installed within the vehicle may be, for example, wirelessly transmitted to PER device 210 via short range wireless communications.

Process 600 may further include performing vehicle crash detection based on the accelerometer data (block 620). For example, in one implementation, controller 360 may use a classification model (potentially including pattern recognition techniques) to determine, based on acceleration data or other data, when a vehicle crash is detected. The classification model may generally be based on detecting a sudden deceleration that may indicate a vehicle collision. The classification model may be trained ahead of time based on training data that includes acceleration data (or other sensor data) associated with vehicle crashes.

When a crash is not detected (block 630—NO), process 600 may return to block 610, where sensor data may continue to be received (block 610) and used to perform vehicle crash detection (block 620). In this manner, PER device 210 may continually monitor sensor data to determine whether a vehicle crash is detected.

When a crash is detected (block 630—YES), process 600 may include analyzing the audio data, corresponding to the time period of the crash, to determine whether the audio data is consistent with a vehicle collision (block 640). For example, in one implementation, controller 360 may use a classification model (potentially including pattern recognition techniques) to determine, based on the audio data, whether the audio data is consistent with a vehicle crash. The classification model may generally be based on detecting sounds that commonly occur in vehicle accidents, such as screeching tires, impact sounds, car horns, crashing sounds, etc. The classification model may be trained ahead of time based on training data that includes audio data associated with vehicle crashes.

When a crash is not confirmed based on the audio data (block 650—NO), process 600 may return to block 610, where sensor data may continue to be received (block 610) and used to perform vehicle crash detection (block 620). Although the determination of a vehicle crash (blocks 620 and 630) and the analysis of audio data to determine whether the audio data is consistent with a vehicle crash (blocks 640 and 650) were discussed as two separate operations, in some implementations, the determination of a vehicle crash may be determined as one classification operation in which the acceleration data, audio data, and potentially other sensor data, are all provided as inputs to the determination.

When a crash is confirmed based on the audio data (block 650—YES), process 600 may include analyzing post-crash audio data to perform a classification operation to determine whether to automatically call an emergency response operator (block 660). In one implementation, the classification operation may be particularly performed to determine whether the user of PER device 210 is in distress or whether assistance is being provided to the user. For example, controller 360 may use a classification model to apply classification techniques to determine a classification category that applies to the recorded audio. The potential classification categories may be determined during initial training of the classification model, such as by training at PER device 210 and/or at classification server 230. The classification model, to classify the recorded audio, may be implemented using a number of different types of classification techniques, such as BCTs, neural networks, pattern recognition techniques, etc.

Three example classification categories are illustrated in FIG. 6: the classifications labeled "user is in distress," "silence or ambiguous," and "user is not in distress or assistance is being provided to the user." In other implementations, additional possible classification categories may be used. The classification category "user is in distress" may be associated with sounds that indicate that the user is in physical distress. For example, sounds relating to crying, moaning, shouts of pain, etc., may be classified into this classification category. The classification category "silence or ambiguous" may be associated with sounds (or lack of sounds) that do not indicate physical distress or that the user is not in distress. For example, silence or sounds that do not match the "user is in distress" or "user is not in distress or assistance is being provided to the user" categories may be classified into this category. The classification category "user is not in distress or assistance is being provided to the user" may be associated with sounds that indicate that the user is not in distress (e.g., normal conversation, laughing sounds, etc.) or that assistance is already being provided to the user (e.g., siren sounds of emergency response personnel, sounds consistent with the user speaking to an emergency response operator on a mobile phone, etc.).

When the classification category is determined as "user is in distress" or "silence or ambiguous," process 600 may include generating a signal that an event has occurred (block 670). The operation of block 670 may be similar to that of block 460 (FIG. 4) or 560 (FIG. 5). For example, PER device 210 may output an audio, visual, or other indication to a user of PER device 210 indicating that PER device 210 has detected that an event has occurred and that an emergency response operator will be notified. The user may thus be given the opportunity to press cancel button 380 if user does not need assistance. If user does not press cancel button 380 within a certain time period (e.g., 10 seconds), PER device 210 may contact, such as via a wireless cellular connection through network 220, emergency response component 240 to report the potential vehicle accident (block 670). Alternatively, in some implementations, PER device 210 may immediately contact emergency response component 240 without necessarily waiting for the user to press cancel button 380.

In some implementations, such as implementations in which PER device 210 is in communication with one or more devices that are part of the vehicle (e.g., via a short range wireless interface), PER device 210 may, as part of contacting emergency response component 240, control devices in the vehicle. For example, PER device 210 may reduce the volume of an audio system (e.g., the radio) of the vehicle before contacting emergency response component 240.

When the classification category is determined as "user is not in distress or assistance is being provided to the user," process 600 may include forgoing generation of the signal indicating that the event has occurred (block 680). In this situation, the vehicle crash determined based on the acceleration data and audio data (and potentially other sensed data) may not warrant the automatic contacting of an emergency operator by PER device 210. Although not explicitly shown, in this situation, process 600 may return to block 610.

In some implementations, PER device 210 may be used to constantly record audio data ("always on detection"). The recorded audio data may be analyzed and used to augment data from other sensors of PER device 210 to detect user distress and/or to provide independent detection of user distress. For example, PER device 210 may receive, from classification server 230, one or more words, phrases, or sounds that are used to trigger action by PER device 210. In some implementations, classification models, used to detect the words, phrases, or sounds, may alternatively or additionally be received from classification server 230. PER device 210 may then constantly "listen" for the words, phrases, or sounds (via audio sensor 330) and make take actions based on a determination that the user has spoken a command. For example, the phrases "help me" or "help now" may trigger an immediate call for assistance to emergency response component 240 and the phrase "I need assistance" may cause PER device 210 to first verify with the user (such as via an audio verification in which the user can press cancel button 380 to cancel) that the user would like help from emergency response component 240.

Figure 7:
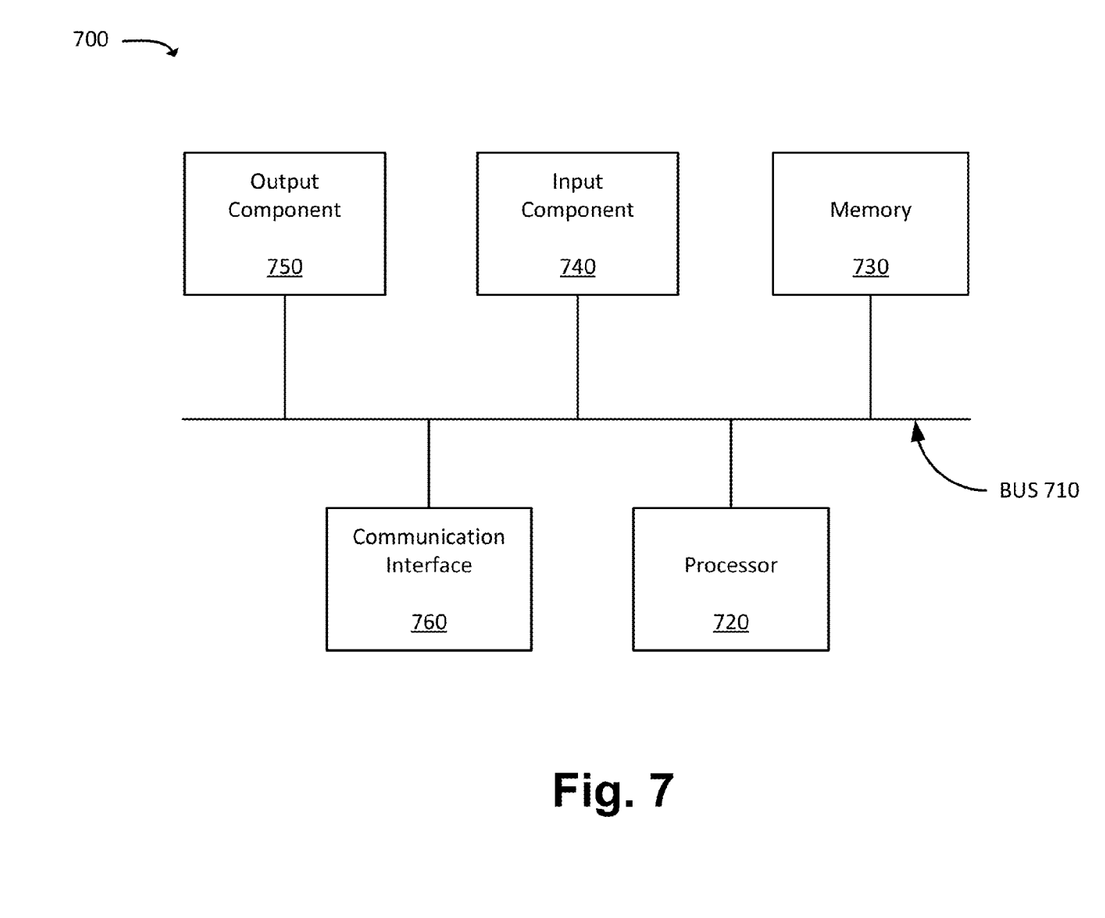
FIG. 7 is a diagram of example components of a device.

FIG. 7 is a diagram of example components of a device 700. The devices illustrated in FIGS. 1-3 may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, a wireless interface, or the like. Communication interface 760 may include a wireless communication device, such as an infrared ("IR") receiver, a Bluetooth® radio, a cellular radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to FIGS. 4-6, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC (application specific integrated circuit) or a FPGA (field programmable gate array), or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A personal emergency response (PER) device comprising:
    an accelerometer to sense acceleration of the PER device;
    at least one processor; and
    a memory including instructions, that when executed by the at least one processor, cause the at least one processor to:
        detect a fall event based on acceleration data sensed by the accelerometer;
        record, based on the detection of the fall event, audio data;
        determine, based on the recorded audio data, whether the detection of the fall event is a false positive signal, the determination including:
            classifying the audio data into one of two classes including:
                a first class that is assigned for sounds associated with any one of user distress, explicit calls for help by the user, and silence, and
                a second class that includes sounds associated with the user not being in distress;
            determining that the detection of the fall event is not a false positive signal when the audio data is classified in the first class;
            determining that the detection of the fall event is a false positive signal when the audio data is classified in the second class; and
        contact an emergency response center when the fall event is determined to not be a false positive signal.

2. The PER device of claim 1, wherein the instructions further cause the at least one processor to:
    receive sensor data relating to activity of the user occurring after the detected fall event, the sensor data including sensor data from at least one of:
        the accelerometer, a pressure sensor, a gyroscope, a magnetometer, a proximity sensor, or a sensor designed to detect a physical condition of the user;
    wherein the determination of whether the detection of the fall event is a false positive signal is additionally based on the sensor data.

3. The PER device of claim 2, the instructions further causing the at least one processor to:
    forgo contacting the emergency response center when the determination of whether the detection of the fall event is a false positive signal, based on the audio data and the received sensor data indicates that the post-fall activity is associated with a non-fall event.

4. The PER device of claim 1, wherein when recording of the audio data, the instructions further cause the at least one processor to:
    record, in response to the detection of the fall event, the audio data for a predetermined period.

5. The PER device of claim 1, wherein the second class additionally includes sounds associated with talking from multiple users.

6. The PER device of claim 1, wherein the classification of the audio data includes classifying the audio data using a classification model that includes a Binary Classification Tree (BCT) model.

7. The PER device of claim 1, wherein contacting the emergency response center further includes:
    providing the emergency response center with the recorded audio data.

8. A method comprising:
    measuring, by an accelerometer associated with a personal emergency response (PER) device, acceleration of the PER;
    detecting, by the PER device and based on the measured acceleration, a fall event;
    recording, by the PER device and based on the detection of the fall event, audio data;
    determining, by the PER device and based on the recorded audio data, whether the detection of the fall event is a false positive signal, the determination including:
        classifying the audio data into one of two classes including:
            a first class that is assigned for sounds associated with any one of user distress, explicit calls for help by the user, and silence, and
            a second class that includes sounds associated with the user not being in distress;
        determining that the detection of the fall event is not a false positive signal when the audio data is classified in the first class;
        determining that the detection of the fall event is a false positive signal when the audio data is classified in the second class; and
    contacting, by the PER device, an emergency response center when the fall event is determined to not be a false positive signal.

9. The method of claim 8, further comprising:
    receiving sensor data relating to activity of the user occurring after the detected fall event, the sensor data including sensor data from at least one of:
        the accelerometer, a pressure sensor, a gyroscope, a magnetometer, a proximity sensor, or a sensor designed to detect a physical condition of the user;

wherein the determination of whether the detection of the fall event is a false positive signal is additionally based on the sensor data.

10. The method of claim 9, further comprising:
refraining from contacting the emergency response center when the determination of whether the detection of the fall event is a false positive signal, based on analyzing of the audio data and the received sensor data indicates that the post-fall activity is associated with a non-fall event.

11. The method of claim 8, wherein the recording of the audio data further comprising:
recording the audio data, in response to the detection of the fall event, for a predetermined period.

12. The method of claim 8, wherein the second class additionally includes sounds associated with talking from multiple users.

13. The method of claim 8, wherein the classification of the audio data includes classifying the audio data using a classification model that includes a Binary Classification Tree (BCT) model.

14. The method of claim 8, wherein contacting the emergency response center further includes:
providing the emergency response center with the recorded audio data.

* * * * *